Oct. 30, 1962 T. R. FELLER 3,061,342
LOCKING AND REMOVAL DEVICE FOR IMPELLERS
Filed Jan. 24, 1961
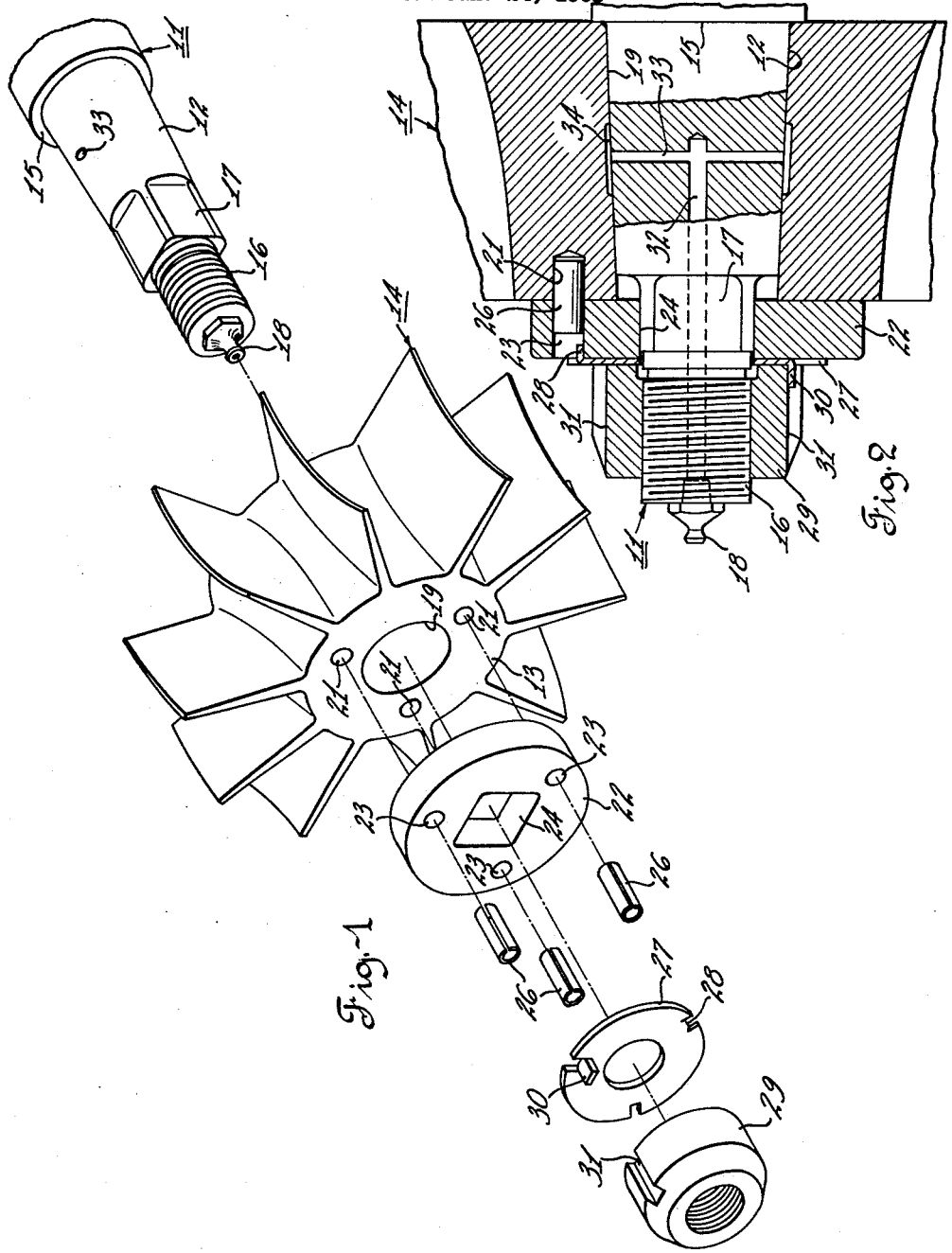
Inventor
Thomas R. Feller
By John P. Hines
Attorney

United States Patent Office 3,061,342
Patented Oct. 30, 1962

3,061,342
LOCKING AND REMOVAL DEVICE
FOR IMPELLERS
Thomas R. Feller, Milwaukee, Wis., assignor to Allis-Chalmers Manufacturing Company, Milwaukee, Wis.
Filed Jan. 24, 1961, Ser. No. 84,670
2 Claims. (Cl. 287—53)

This invention pertains to means for attaching wheels to a shaft and is particularly applicable to the mounting of pump or compressor impellers on a rotating shaft.

In large compressors and pumps and machines of a similar nature, it is necessary that the impeller be connected to the rotating shaft so there will be no relative rotational or axial movement between the shaft and impeller. It has been common practice to provide either a keyed connection between the impeller and the shaft or a splined connection therebetween to hold the impeller against rotational movement relative to the shaft. By providing keyways or splines in the impeller hub, the strength of the hub is considerably weakened. Applicant has found through destruction tests that whenever an impeller fails it invariably fails along the inner line of the spline or keyway.

To overcome this weakening of the impeller, tapered connections have been provided between the shaft and impeller. In this type of connection the impeller is forced onto the tapered portion of the shaft which results in an interference fit therebetween. However, due to the large forces set up in large machines where the impellers are revolving at considerably high speeds, it is also necessary to provide an additional locking connection between the shaft and the impeller so that relative rotational movement will not exist. Here again, if a keyway or spline is provided, the impeller is weakened. Furthermore, adding keyways or splines adds to the expense of the connection.

An additional problem that results whenever a large impeller is mounted on a shaft, which is particularly evident when there is a tapered connection, is the difficulty of removing the impeller from the shaft for servicing or inspection. In most cases it is necessary to use a large wheel puller or some type of large force to remove the impeller from the shaft. In some instances, high pressure fluid is forced into a chamber so that the fluid acts on a portion of the impeller and on a portion of the shaft forcing the impeller from the shaft. This, however, requires a shoulder on the shaft against which the injected fluid can react and adds to the expense of the connection. Furthermore, if a pressure fluid is employed to remove an impeller from a shaft having a tapered connection with splines or keyways, the impeller is further weakened by providing the chamber between the splines or the keyway slots in the impeller hub. Furthermore, it is necessary to seal the fluid chamber from the splines or keyways so that the fluid pressure can be built up to force the impeller from the shaft.

It is, therefore, a general object of the subject invention to provide a connection between a hub and a rotating shaft whereby no keyway or spline connection is necessary.

A further object of the invention is to provide a connection between a tapered shaft and a hub whereby fluid is forced into a chamber defined by the hub and the shaft causing the hub to expand releasing the interference fit between the hub and shaft.

An additional object of the subject invention is to provide a connection between a hub and a tapered shaft wherein a portion of the outer end of the shaft has plane surfaces thereon which mate with plane surfaces on a pressure plate removably attached to the hub.

A further object of the invention is to provide a connection between large high speed rotating elements wherein these elements are easily connected and easily disconnected and whereby the parts of the connection are not destroyed when the rotating elements are separated.

These and other objects of the invention will become more fully apparent as the following description is read in light of attached drawings wherein:

FIG. 1 is an exploded isometric view of the invention; and

FIG. 2 is a vertical cross section of the assembled connection of the invention.

Referring to FIG. 1, a shaft generally designated 11 has a tapered portion 12 thereon. At the larger end of the tapered portion is a shoulder 15 which limits the extent of insertion of the shaft 11 into a hub 13 of an impeller generally designated 14. The outer end of the shaft is cylindrical and has a threaded portion 16 thereon. Between the threaded portion and the smaller end of the tapered portion is a square machined portion 17. Attached to the outer end of the shaft 11 and positioned in line with the axis of the shaft is a conventional grease fitting 18.

The impeller hub 13 has an opening 19 therethrough which is tapered to receive the tapered portion 12 of the shaft and causes an interference fit to exist therebetween. Also provided in the face of the hub remote from the shoulder 15 are a series of circumferentially spaced holes 21. In the preferred embodiment shown herein there are three holes 21 equally spaced about the tapered opening through the hub and also equally spaced from one another.

A pressure plate 22 shown herein as having a cylindrical configuration is provided with three through holes 23 which upon installation of the impeller to the shaft are aligned with the holes 21 in the impeller hub 13. The pressure plate 22 has a centrally located axially defined opening 24 therethrough. The opening 24 has a configuration to match the square configuration of the square portion 17 of the shaft 11. As shown in FIG. 2, after the impeller has been placed on the shaft the pressure plate 22 is placed on the square portion of the shaft and drive pins 26 are inserted through the holes 23 in the pressure plate and into the holes 21 in the impeller hub.

A lock washer 27 may be provided with ears or prongs 28 which may be inserted into the holes 23 in the pressure plate to hold the pins 26 in place. A nut 29 is threaded onto the threaded portion 16 of the shaft and thereby holds the pressure plate 22 against the hub 13. The nut 29 may be of any conventional type and is shown herein as having 180 degree opposed slots 31 for conventional spanner wrench tightening. The lock washer 27 may be provided with an additional prong 30 for insertion into the spanner slot to hold the nut against turning relative to the remaining portions of the connection. Because of the connection between the square portion of the shaft and the pressure plate 22 and due to the pinned connection between the pressure plate and the hub 13, there is a removable rigid connection between the shaft and the hub which does not require a keyway or splines.

A longitudinally disposed passageway 32 is drilled along the axis of the shaft 11 terminating within the tapered portion 12 of the shaft. Radially extending passages 33 are provided to connect a chamber 34 on the inner periphery of the hub 13 with the axially extending passageway 32.

Procedure of Assembly

The taper bore of the impeller is slipped onto the taper of the shaft, but not secured. The square 24 in the drive plate 22 is then fitted to the square portion 17 on the shaft. With the plate in place the impeller nut 29 is turned onto the threaded portion 16 of the shaft and the impeller with the drive plate in place is drawn up to the shoulder 15 on the shaft.

The drive plate 22 is previously prepared with drilled pilot holes for drilling the final holes 21 and 23 for the drive pins 26 that transmit the torque from the shaft to the impeller. The pilot holes in the drive plate are predrilled 1/32 inch in diameter undersize of the holes to be used for the drive pin holes 21 and 23. This is to achieve a dual purpose; (1) to locate the holes 21 to be drilled into the impeller and (2) to assure an accurate fit between the drive plate 22, impeller 14 and the pins 26. Drilling in this manner assures uniform contact on the pin by the impeller and the drive plate. The drive pin is used to eliminate the necessity of reaming the pin holes.

With the drive plate in proper position and secured with the impeller nut, one of the holes in the drive plate is drilled out to the proper size for the pin and this drill is continued through the drive plate and into the impeller to the proper predetermined depth. The drill is removed and a pin is driven into the hole to a depth of approximately 1/4 inch below the face of the drive plate. This is done to provide room for the prongs 28 of the lockwasher 27. This same procedure is followed for the remaining holes.

It may be noted that once the drive plate has been assembled to the impeller it need never be removed unless the impeller is replaced. For a replacement of the impeller the plate can easily be removed by use of a driving rod through the bore from the back face of the impeller. The plate can be used for the new impeller.

With the drive plate secured with the spring steel drive pins the nut 29 is removed and lockwasher 27 slipped over the shaft into its proper position. This position is with the prongs inserted into the drive pin holes 23. These prongs key the lockwasher to the impeller through the drive plate thereby preventing rotation of the lockwasher relative to the impeller. The nut 29 is then turned to its final position on the shaft and slammed tight using a spanner wrench and a hammer. At this point the lockwasher is matchmarked and marked for the prong 30 to be driven into one of the two spanner wrench slots 31 in the nut. The nut is removed and then the lockwasher is cut for the prong 30 but the prong is not bent. The lockwasher is then assembled in exactly the same position as before (matchmarks) and the nut is again drawn up tight and slammed to the point where the prong has been cut and the prong 30 is bent into the spanner wrench slot 31 preventing the nut from turning relative to the impeller.

The lockwasher actually serves a dual purpose (1) locks the nut in position and (2) prevents the drive pins from working out of the drive pin holes in an axial direction.

To remove the impeller 14 the prong 30 is straightened and the lock nut 29 is backed off approximately three or four threads from the impeller hub. Using a standard high pressure grease gun, grease is injected into the drilled passages 32 and 33 that feed the chamber 34 of the impeller hub. When all cavities are completely full of grease, the pressure will build up within the impeller bore expanding the hub slightly. With a few sharp pulls on the grease gun the internal pressure will break the impeller free from the interference fit to the shaft taper. The impeller will slide against the nut and can then be removed from the shaft easily.

This entire procedure will not damage either the shaft or the impeller. The only part receiving any abuse is the lockwasher and this is an inexpensive part and easily replaced.

Although only one embodiment of the present invention has been illustrated and described herein, it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. In combination: a hub having a tapered bore therethrough, one end of said hub having a plane surface disposed at right angles to the axis of said bore; walls defining an opening in said plane surface; a shaft having a tapered portion received in said tapered bore, said shaft having a portion extending beyond the plane surface of said hub and having a threaded portion thereon, the portion of said shaft intermediate said threaded portion and said tapered portion having plane surfaces thereon disposed at right angles to the axis of said shaft; a disk having a plane surface in abutting relation to said plane surface of said hub, said disk having an opening therethrough with the walls of said opening defining plane surfaces in abutting relation to the plane surfaces of said shaft; walls defining an opening through said disk in alignment with said opening in said hub; an elongated member contained in said aligned openings of said disk and said hub to hold same against relative rotational movement; an internally threaded member on said threaded portion of said shaft holding said disk against said hub; and a lock washer interposed between said internally threaded member and said disk and having a prong extending into said opening through said disk to hold said elongated member against axial movement in one direction.

2. In combination: a hub having a tapered bore therethrough, one end of said hub having a plane surface disposed at right angles to the axis of said bore; walls defining an opening in said plane surface, the axis of said opening being parallel to the axis of said tapered bore; a shaft having a tapered portion received in said tapered bore, said shaft having a portion extending beyond the plane surface of said hub and having a threaded portion thereon, the portion of said shaft intermediate said threaded portion and said tapered portion having plane surfaces thereon disposed at right angles to the axis of said shaft; a fluid chamber formed by a recess in the inner peripheral surface of said hub and the outer peripheral surface of said tapered portion of said shaft; an axially extending passage in said shaft extending from the threaded portion thereof and terminating adjacent said fluid chamber; a radially extending passage connecting said axial passage to said fluid chamber; a disk having a plane surface in abutting relation to said plane surface of said hub, said disk having an opening therethrough with walls defining plane surfaces in abutting relation to the plane surfaces of said intermediate portion of said shaft; walls defining an opening through said disk in alignment with said opening in said hub; an elongated member contained in said aligned openings of said disk and said hub to hold said disk and said hub against relative rotational movement; an internally threaded member on said threaded portion of said shaft holding said disk against said hub; and a lockwasher interposed between said internally threaded member and said disk and having prongs thereon extending into said opening through said disk to hold said elongated member against axial movement in one direction.

References Cited in the file of this patent

UNITED STATES PATENTS 2,840,399     Harless et al. _____ June 24, 1958

FOREIGN PATENTS 17,888     Great Britain _____ Aug. 9, 1906